(12) United States Patent
Su

(10) Patent No.: US 9,459,699 B2
(45) Date of Patent: Oct. 4, 2016

(54) CONTROL METHOD AND ELECTRONIC DEVICE

(71) Applicants: Beijing Lenovo Software Ltd., Beijing (CN); Lenovo (Beijing) Co., Ltd., Beijing (CN)

(72) Inventor: Li Su, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/584,420

(22) Filed: Dec. 29, 2014

(65) Prior Publication Data

US 2016/0004317 A1    Jan. 7, 2016

(30) Foreign Application Priority Data

Jul. 7, 2014    (CN) .......................... 2014 1 0320560

(51) Int. Cl.
*G06F 3/01* (2006.01)
*G06F 3/03* (2006.01)

(52) U.S. Cl.
CPC ............. *G06F 3/017* (2013.01); *G06F 3/0304* (2013.01)

(58) Field of Classification Search
CPC ........ G06F 3/011; G06F 3/012; G06F 3/013; G06F 3/017; G06F 2200/1637; G06F 3/014; G06F 3/015; G06F 3/0304; G02B 27/0093; G02B 27/01; G02B 27/0101; G02B 2027/0138; G02B 2027/0134; G02B 2027/0143
See application file for complete search history.

(56) References Cited

U.S. PATENT DOCUMENTS

| 2008/0134102 A1* | 6/2008 | Movold | G06F 3/017 |
| | | | 715/863 |
| 2013/0066526 A1* | 3/2013 | Mondragon | G09G 5/00 |
| | | | 701/48 |

* cited by examiner

*Primary Examiner* — Lun-yi Lao
*Assistant Examiner* — Jarurat Suteerawongsa
(74) *Attorney, Agent, or Firm* — Harness, Dickey & Pierce, P.L.C.

(57) ABSTRACT

A control method and an electronic device are provided in this application. The control method includes: determining a first operating area where an operator performs a gesture operation according to sensing information obtained by the at least two sensing units, where, sensing information from various spatial areas are obtained the at least two sensing units, the first operating area includes at least one spatial area of the various spatial areas; and generating and executing a first control instruction corresponding to the first operating area based on at least a configuration relationship between an operating area and an instruction, where the first control instruction is different from a second control instruction which is generated when the operator performs a gesture operation in a second operating area.

18 Claims, 6 Drawing Sheets

CONTROL METHOD AND ELECTRONIC DEVICE

The present application claims the priority to Chinese Patent disclosure No. 201410320560.5, entitled as "CONTROL METHOD AND ELECTRONIC DEVICE", filed on Jul. 7, 2014 with State Intellectual Property Office of People's Republic of China, which is incorporated herein by reference in its entirety.

FIELD

The present application relates to the field of electronic technology, particularly to a control method and an electronic device.

BACKGROUND

Popularity of smart devices has better and better experiences to users. Presently, gesture recognition with a front-facing camera has become a mainstream trend of smart devices, where a smart device is controlled through gesture recognition.

At present, a front-facing camera controls content displayed on a smart device merely by simply recognizing a direction of a movement, such as a wave to left or to right. As can be seen, by the conventional technical solution, the direction of the movement of an operator is recognized merely by a front-facing camera, so the front-facing camera cannot recognize a gesture of the operator once the operator moves too fast. Therefore, by the gesture recognition with a front-facing camera in conventional technical solution, a recognition rate is low, and the electronic device can be controlled merely in few simple ways, such as a movement to left or to right.

SUMMARY

A control method and an electronic device are provided in embodiments of the application, thereby solving a technical problem of a low recognition rate of gesture recognition with a front-facing camera in conventional technology, as well as a technical problem in conventional technology that an electronic device can be controlled merely in simple ways, such as a movement to left or to right.

In a first aspect, a control method is provided in an embodiment of the application. The control method is applied to an electronic device, on which at least two sensing units are arranged. The method includes:

determining a first operating area where an operator performs a gesture operation according to sensing information obtained by the at least two sensing units, where, sensing information from various spatial areas are obtained by the at least two sensing units, the first operating area includes at least one spatial area of the various spatial areas; and generating and executing a first control instruction corresponding to the first operating area based on at least a configuration relationship between an operating area and an instruction, where the first control instruction is different from a second control instruction which is generated when the operator performs a gesture operation in a second operating area.

Determining a first operating area where an operator performs a gesture operation according to sensing information obtained by the at least two sensing units includes:

determining, according to the sensing information, each sensing unit sensing the operator, and temporal information of sensing an operator by each sensing unit; and calculating information of variation of spatial areas corresponding to the first operating area where the operator passes according to the temporal information of sensing the operator by each sensing unit, where each sensing unit is distinguished by a unit identity.

In the case that the at least two sensing units include a first sensing unit and a second sensing unit, information of a first spatial area is sensed by the first sensing unit, information of a second spatial area is sensed by the second sensing unit, and information of a third spatial area is sensed by both the first sensing unit and the second sensing unit.

Generating and executing a first control instruction corresponding to the first operating area based on at least a configuration relationship between an operating area and an instruction includes:

generating and executing a first sub-control information for switching forward with a plurality of outputs if the first operating area varies at least from the first spatial area to the third spatial area;

generating and executing a second sub-control information for switching backward with a plurality of outputs if the first operating area varies at least from the second spatial area to the third spatial area;

generating and executing a third sub-control information for switching forward or backward with one output if the first operating area is inside the third spatial area.

After the sensing information obtained by the at least two sensing units, the method further includes:

obtaining gesture information of the gesture operation from the sensing information, where the gesture information is for assisting in determining the first control instruction.

Generating and executing a first control instruction corresponding to the first operating area based on at least a configuration relationship between an operating area and an instruction includes:

generating and executing a fourth sub-control instruction in the case that the first operating area is determined including the third spatial area, otherwise forbidding responding to the gesture operation.

The at least two sensing units include: distance sensing units, image capture units, or light sensing units.

In a second aspect, an electronic device, on which at least two sensing units are arranged, is provided in an embodiment of the application. The electronic device further includes:

a determination unit determining a first operating area where an operator performs a gesture operation according to sensing information obtained by the at least two sensing units, where, sensing information from various spatial areas are obtained by the at least two sensing units, the first operating area includes at least one spatial area of the various spatial areas; and an execution unit generating and executing a first control instruction corresponding to the first operating area based on at least a configuration relationship between an operating area and an instruction, where the first control instruction is different from a second control instruction which is generated when the operator performs a gesture operation in a second operating area.

The determination unit:

determines, according to the sensing information, each sensing unit sensing the operator, and temporal information of sensing an operator by each sensing unit; and calculates information of variation of spatial areas corresponding to the first operating area where the operator passes according to the temporal information of sensing the operator by each sensing unit, where each sensing unit is distinguished by a unit identity.

In the case that the at least two sensing units include a first sensing unit and a second sensing unit, information of a first spatial area is sensed by the first sensing unit, information of a second spatial area is sensed by the second sensing unit, and information of a third spatial area is sensed by both the first sensing unit and the second sensing unit.

The execution unit:

generates and executes a first sub-control information for switching forward with a plurality of outputs if the first operating area varies at least from the first spatial area to the third spatial area;

generates and executes a second sub-control information for switching backward with a plurality of outputs if the first operating area varies at least from the second spatial area to the third spatial area;

generates and executes a third sub-control information for switching forward with one output if the first operating area is inside the third spatial area.

The electronic device further:

obtains gesture information of the gesture operation from the sensing information, where the gesture information is for assisting in determining the first control instruction.

The execution unit further:

generates and executes a fourth sub-control instruction if the first operating area is determined including the third spatial area, otherwise forbidding responding to the gesture operation.

The at least two sensing units include: distance sensing units, image capture units, or light sensing units.

Due to the at least two sensing units provided in the electronic device, a first operating area where an operator performs a gesture operation is determined according to sensing information obtained by at least two sensing units, where, sensing information from various spatial areas are obtained by the at least two sensing units, the first operating area includes at least one spatial area of the various spatial areas; and a first control instruction corresponding to the first operating area is generated and executed, based on at least a configuration relationship between an operating area and an instruction, where the first control instruction is different from a second control instruction which is generated when the operator performs a gesture operation in a second operating area. Thus, gesture recognition is based on the situation that an operator is sensed by sensing units, and sensing information from two sensing units are combined, for example, a direction of a gesture operation is determined according to an order of recognizing the operator, the technical problem of a low gesture recognition rate in conventional technology is solved. The gesture recognition rate is improved.

In addition, various control instructions for the electronic device may be generated according to various spatial areas formed by at least two sensing units, various orders of spatial areas in which the operating area has been, or various spatial areas in which the operating area has been. Thus, the technical problem in conventional technology that an electronic device can be controlled merely in few simple ways, such as a movement to left or to right, is solved. A technical effect of diversification of controlling an electronic device by gestures is achieved, and a user experience is improved.

BRIEF DESCRIPTION OF THE DRAWINGS

For clarity of description of technical solutions in embodiments of the application or in conventional technology, drawings for description of the embodiments or of conventional technology are described below briefly. Apparently, the drawings described below are merely a few embodiments of the application. For those skilled in the art, according to these drawings, other drawings may be obtained without paying any creative work.

DETAILED DESCRIPTION

To solve a technical problem of a low recognition rate of gesture recognition with a front-facing camera in conventional technology, as well as a technical problem in conventional technology that an electronic device can be controlled merely in simple ways, such as a movement to left or to right, a control method and an electronic device are provided in embodiments of the application.

At least two front-facing sensing units are arranged, where different sensing units cover different spatial areas. A first operating area where an operator performs a gesture operation is determined according to sensing information obtained by the at least two sensing units. The first operating area may be a spatial area covered by different sensing units, and then various control instructions are generated according to configuration relationships between operating areas and instructions, to achieve diversified control of the electronic device.

Next, to make the object, technical solutions, and advantages of embodiments of the application clearer, the technical solutions in the embodiments of the application are clearly and fully described in combination with the drawings in the embodiments of the application. Apparently, the described embodiments are merely a few instead of all embodiments of the application. Based on the embodiments in the application, any other embodiment obtained by those skilled in the art without creative work falls within the scope of the application.

The control method provided in an embodiment of the application is applied to an electronic device, on which at least two sensing units are arranged. In particular, the electronic device to which the control method applied may be any electronic device requiring human-machine interaction, such as a cell phone, a personal digital assistant (PDA), a laptop, a game device, a public information inquiry system. The at least two sensing units arranged on the electronic device may be sensing units able to sense a gesture operation of a user, such as at least two cameras, at least two distance sensing units, or at least two light sensing units.

Figure 1:
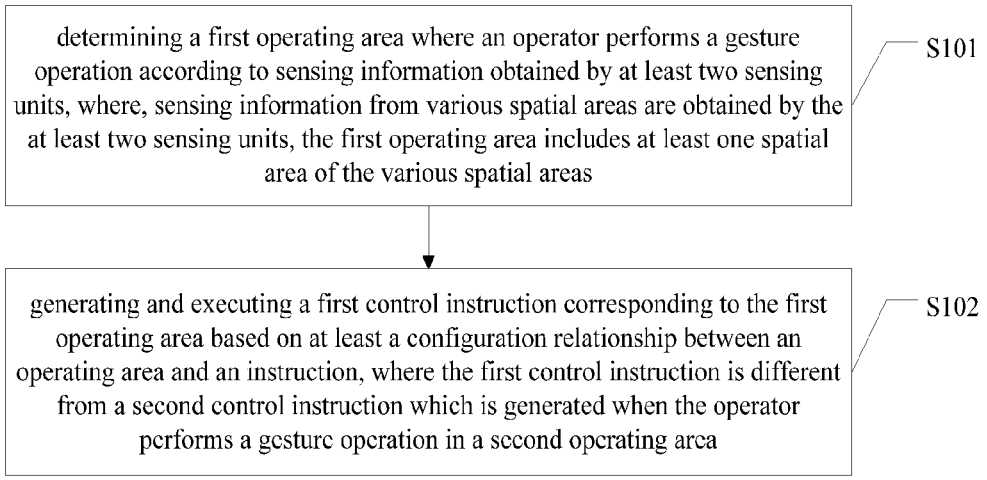
FIG. 1 is a flow chart of a control method according to an embodiment of the application.

As shown in FIG. 1, the method includes S101 and S102.

S101 includes: determining a first operating area where an operator performs a gesture operation according to sensing information obtained by at least two sensing units, where, sensing information from various spatial areas are obtained by the at least two sensing units, the first operating area includes at least one spatial area of the various spatial areas.

The at least two sensing units may be arranged in a lot of ways, to be adapted for various habits of gesture operations. Next, the ways of arrangement is described below with examples, which is not to limit the application.

Figure 2A:
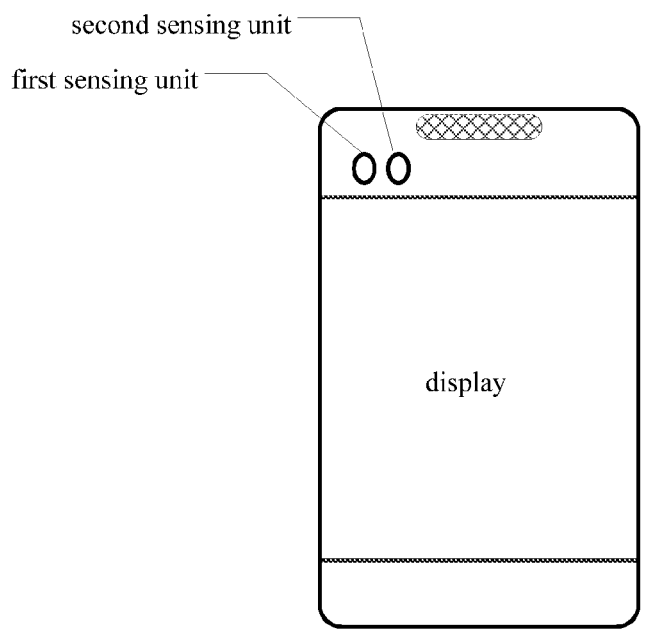
FIG. 2A is a diagram of a first configuration of sensing units according to an embodiment of the application.
Figure 2B:
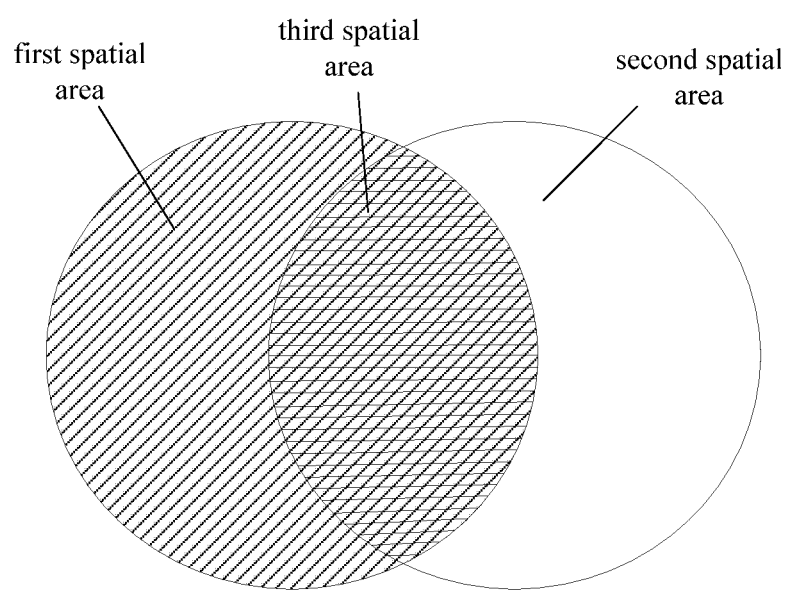
FIG. 2B is a diagram of spatial areas formed by the sensing units in FIG. 2A according to an embodiment of the application.
Figure 3A:
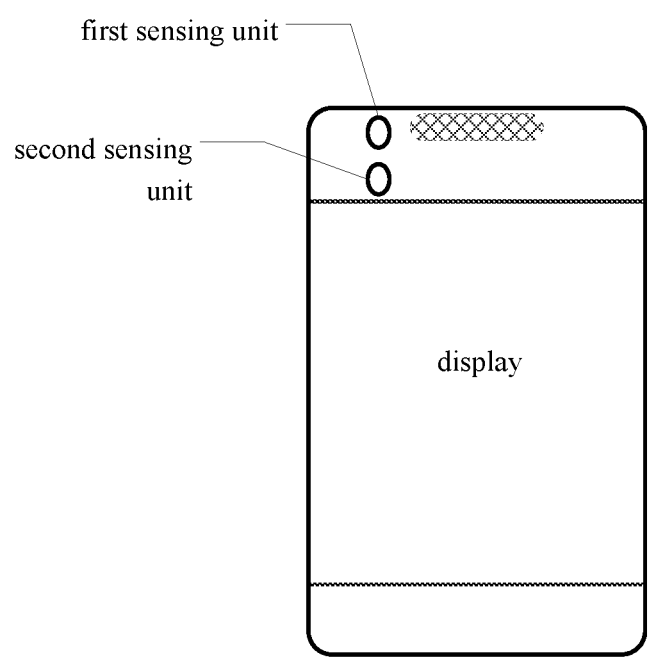
FIG. 3A is a diagram of a second configuration of sensing units according to an embodiment of the application.
Figure 3B:
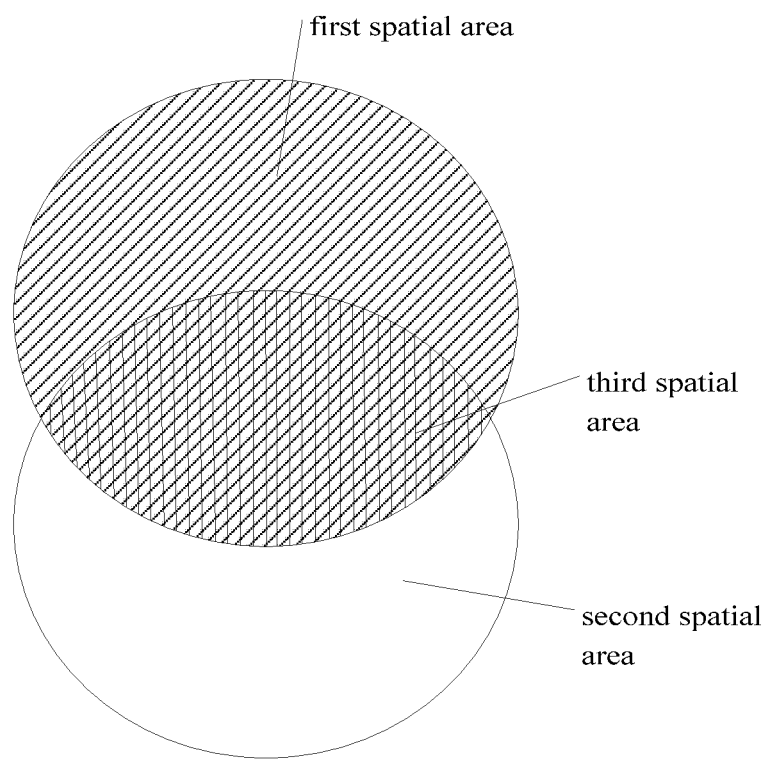
FIG. 3B is a diagram of spatial areas formed by the sensing units in FIG. 3A according to an embodiment of the application.

For example, a first sensing unit and a second sensing unit are arranged. As shown in FIG. 2A, the first sensing unit and the second sensing unit may be arranged at two different positions at a same horizontal level on the electronic device, to form three spatial areas, as shown in FIG. 2B, including a first spatial area which can be sensed by the first sensing unit, a second spatial area which can be sensed by the second sensing unit, and a third spatial area which can be sensed by both the first sensing unit and the second sensing unit. As shown in FIG. 3A, the first sensing unit and the second sensing unit may be arranged at two different positions in a vertical direction on the electronic device, to form three spatial areas, as shown in FIG. 3B, including a first spatial area which can be sensed by the first sensing unit, a second spatial area which can be sensed by the second sensing unit, and a third spatial area which can be sensed by both the first sensing unit and the second sensing unit.

Figure 4A:
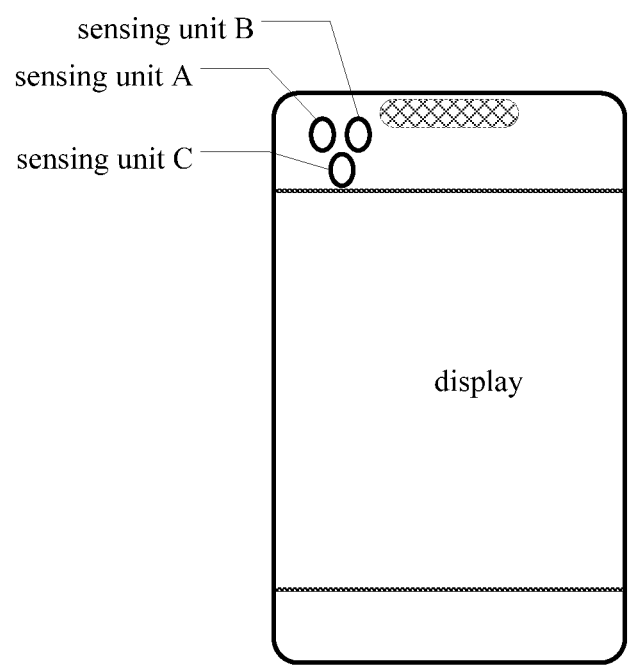
FIG. 4A is a diagram of a third configuration of sensing units according to an embodiment of the application.
Figure 4B:
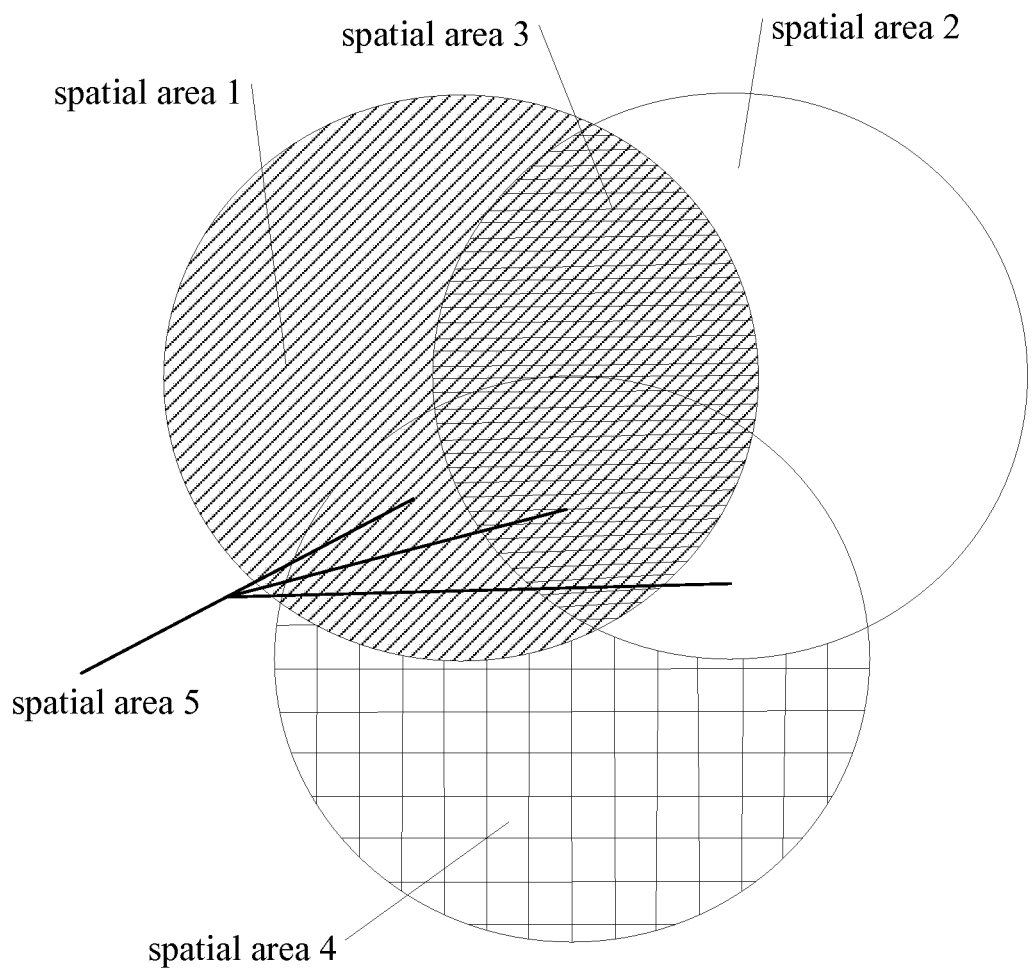
FIG. 4B is a diagram of spatial areas formed by the sensing units in FIG. 4A according to an embodiment of the application.

For example, three sensing units may be arranged. As shown in FIG. 4A, the three sensing units are arranged as an equilateral triangle, to form five spatial areas, as shown in FIG. 4B. In particular, it may be defined as a spatial area 1 which can be sensed by a sensing unit A, a spatial area 2 which can be sensed by a sensing unit B, and a spatial area 3 which can be sensed by both the sensing unit A and the sensing unit B. a spatial area 4 which can be sensed by a sensing unit C, and a spatial area 5 which can be sensed by the sensing unit C and other sensing units (other sensing units indicates the sensing unit A and/or the sensing unit B). By this implementation, spatial areas passed by operating areas of gesture operations in various directions can be recognized, thus enabling more accurate and diverse controls.

In an implementation, sensing information is temporal information of sensing an operator by each sensing unit. In particular, the temporal information may be a period during which the operator in a spatial area is sensed by the sensing unit, or may be a moment when the operator is sensed by the sensing unit, or may be a sequence of sensing the operator by various sensing units. In particular, each sensing unit is distinguished by a unit identity.

S101 includes: determining, according to the sensing information, each sensing unit sensing the operator, and temporal information of sensing an operator by each sensing unit; and calculating, according to the temporal information of sensing the operator by each sensing unit, information of variation of spatial areas corresponding to the first operating area where the operator passes.

For example, referring to FIG. 2A, if the operator is sensed by the first sensing unit, it indicates that the first operating area is in the first spatial area, or varies from a blind area, which can not be sensed by either the first sensing unit or the second sensing unit, into the first spatial area. If the operator is sensed by the first sensing unit in a first period, and then the operator is sensed by both the first sensing unit and the second sensing unit in a second period after and continuous with the first period, it indicates that the first operating area varies from the first spatial area into the third spatial area, or varies first from the blind area into the first spatial area, and then into the third spatial area.

According to this, information of variation of spatial areas corresponding to the first operating area where the operator passes can be determined according to the sensing information from the sensing units.

S102 includes: generating and executing a first control instruction corresponding to the first operating area based on at least a configuration relationship between an operating area and an instruction, where the first control instruction is different from a second control instruction which is generated when the operator performs a gesture operation in a second operating area.

In particular, in order to accurately control various applications according to gesture operations, in technical solutions in the embodiment of the application, configuration relationships adaptive to applications are configured according to the various applications. For example, configuration relationships may be pre-configured by configuration relationship tables in the electronic device, and the configuration relationship table adaptive to a running application is called when the application requiring a gesture operation is in a running state.

In an implementation, configuration relationships are various with application environments and applications, as described below with examples.

First Implementation

When a user controls an electronic device outdoors with gesture operations, the control by gesture operations of the users may be affected by gestures of other people, and misrecognition may be caused. Therefore, it may be set that a first operation area is valid only if the first operation area is in a public spatial area which can be sensed by at least two sensing units, and the public spatial area corresponds to a control instruction. In particular, the foregoing condition where a first sensing unit and a second sensing unit are arranged is provided, the S102 includes: generating and executing a fourth sub-control instruction for controlling displayed content if the first operating area being determined includes the third spatial area, otherwise forbidding responding to the gesture operation. A particular type of the fourth sub-control instruction generated is not limited here.

The foregoing condition where a sensing unit A, a sensing unit B and a sensing unit C are arranged is provided, the S102 includes: generating and executing a fourth sub-control instruction for controlling displayed content if first operating area is determined including the third spatial area or the fifth spatial area, otherwise forbidding responding to the gesture operation.

The first implementation is described below with a scenario of a "play application" or an "image viewer application" in a running state, and in the foregoing condition where a first sensing unit and a second sensing unit are arranged. The scenario and the condition are not to limit the application.

When the "play application" is playing a song, and a user performs a gesture operation, a fourth sub-control instruction for controlling the "play application" is generated and executed if it is determined according to S101 that a first operation area of the gesture operation includes the third spatial area; else if the first operation area of the gesture operation does not include the third spatial area, for example the first spatial area or the second spatial area is included, then the gesture operation is not responded. The fourth sub-control instruction may be: switch to the "previous"

one, switch to the "next" one, pause, fast forward, or fast backward, etc, which is determined according to a configuration relationship.

Alternatively, when the "image viewer application" is running, and a user performs a gesture operation, a fourth sub-control instruction is generated and executed if it is determined according to S101 that a first operation area of the gesture operation includes the third spatial area. The fourth sub-control instruction is for controlling the "image viewer application" to switch to a "previous" image, or to switch to a "next" image, which is determined according to a configuration relationship; else if the first operation area of the gesture operation does not include the third spatial area, for example the first spatial area or the second spatial area is included, then the gesture operation is not responded.

Second Implementation

In order to achieve diverse controls on an electronic device according to gesture operations, multiple types of control instructions may be generated according to various spatial areas where a first operation area passes. In particular, in the same foregoing condition where a first sensing unit and a second sensing unit are arranged, the S102 includes: generating and executing a first sub-control information for switching forward with a plurality of outputs if the first operating area varies at least from the first spatial area to the third spatial area; generating and executing a second sub-control information for switching backward with a plurality of outputs if the first operating area varies at least from the second spatial area to the third spatial area; generating and executing a third sub-control information for switching forward or backward with one output if the first operating area is inside the third spatial area.

The second implementation is described with an example of an "e-Book application" in a running state, which is not to limit the application.

For example, the "e-Book application" is displaying "page 92" of a total number of pages, section 2. When a user performs a gesture operation, it is determined according to S101 that a first operation area of the gesture operation is inside the first spatial area. There are multiple possibilities for the determined first operating area.

It is switched to "page 1 of section 1" if the first operating area varies from the first spatial area into the third spatial area, which may include two cases: from the first spatial area into the third spatial area; or firstly from the first spatial area into the third spatial area, and then into the second spatial area.

It is switched to "page 1 of section 3" if the first operating area varies from the second spatial area into the third spatial area, which may include two cases: from the second spatial area into the third spatial area; or firstly from the second spatial area into the third spatial area, and then into the first spatial area.

It is switched to "page 91" if the first operating area is an operation in a first direction in the third operation area.

It is switched to "page 93" if the first operating area is an operation in a second direction in the third operation area, where the second direction is opposite to the first direction.

For another example, an "image viewer application" is in a running state. An image is slid if the first operating area is inside the third spatial area; images are slid until a first image if the first operating area is inside the first spatial area; and images are slid until a last image if the first operating area is inside the second spatial area.

Certainly, in an implementing process, a configuration relationship between an operating area and an instruction in the second implementation is not limited to the foregoing examples. Other configuration relationships may be configured by those skilled in the art according to similar implementing principles. Other configuration relationships are not as exhaustive listed here.

By the second implementation, one gesture operation may correspond to different control instructions because the gesture operation may be sensed by different sensing units. Therefore, multiple functions can be achieved by one gesture operation.

In an implementing process, the foregoing first implementation and the second implementation may be configured in one electronic device, and may be chosen by a user according to application environment.

Further, in an implementing process, the sensing information further includes gesture information such as a direction of the gesture or a speed of the gesture. The technical solution in the embodiment of the application further includes:

obtaining gesture information of the gesture operation from the sensing information, where the gesture information is for assisting in determining the first control instruction.

For example, a speed of switching displayed content is controlled to correspond to a speed of the gesture if the gesture information is the speed of the gesture, thereby improving a user's experience. For another example, a direction of the gesture operation is determined by both the foregoing temporal information and a direction of the gesture if the gesture information is the direction of the gesture, thereby further ensuring accuracy of gesture recognition.

Based on a same inventive concept, an electronic device with at least two sensing units is provided in an embodiment of the application. The electronic device further includes following functional modules:

a determination unit, configured to determine a first operating area where an operator performs a gesture operation according to sensing information obtained by the at least two sensing units, where, sensing information from various spatial areas are obtained by the at least two sensing units, the first operating area includes at least one spatial area of the various spatial areas; and an execution unit, configured to generate and execute a first control instruction corresponding to the first operating area based on at least a configuration relationship between an operating area and an instruction, where the first control instruction is different from a second control instruction which is generated when the operator performs a gesture operation in a second operating area.

The determination unit is configured to:

determine, according to the sensing information, each sensing unit sensing the operator, and temporal information of sensing an operator by each sensing unit; and calculate information of variation of spatial areas corresponding to the first operating area where the operator passes according to each unit identity and the temporal information of sensing the operator by each sensing unit.

In the case that the at least two sensing units include a first sensing unit and a second sensing unit, information of a first spatial area is sensed by the first sensing unit, information of a second spatial area is sensed by the second sensing unit, and information of a third spatial area is sensed by both the first sensing unit and the second sensing unit.

The execution unit is configured to:

generate and execute a first sub-control information for switching forward with a plurality of outputs if the first operating area varies at least from the first spatial area to the third spatial area;

generate and execute a second sub-control information for switching backward with a plurality of outputs if the first operating area varies at least from the second spatial area to the third spatial area;

generate and execute a third sub-control information for switching forward with one output if the first operating area is inside the third spatial area.

The electronic device in this embodiment and the control method in the previous embodiment are two aspects of a same inventive concept. Therefore, based on the control method described in the embodiment of the application, those skilled in the art can understand implementations of the electronic device in this embodiment, as well as variations thereof, which are not repeatedly described in detail here. Any electronic device, by which those skilled in the art carry out the control method in the embodiment, falls within the scope of the application.

At least two sensing units are provided in the electronic device, a first operating area where an operator performs a gesture operation is determined according to sensing information obtained by the at least two sensing units, where, sensing information from various spatial areas are obtained by the at least two sensing units, the first operating area includes at least one spatial area of various spatial areas; and a first control instruction corresponding to the first operating area is generated and executed based on at least a configuration relationship between an operating area and an instruction, where the first control instruction is different from a second control instruction which is generated when the operator performs a gesture operation in a second operating area. Thus, gesture recognition is based on the situation that an operator is sensed by sensing units, and sensing information from two sensing units are combined, for example, a direction of a gesture operation is determined according to an order of recognizing the operator, the technical problem of a low gesture recognition rate in conventional technology is solved. The gesture recognition rate is improved.

In addition, various control instructions for the electronic device may be generated according to various spatial areas formed by at least two sensing units, various orders of spatial areas in which the operating area is, or various spatial areas in which the operating area is. Thus, the technical problem in conventional technology that an electronic device can be controlled merely in simple ways, such as a movement to left or to right, is solved. A technical effect of diversification of controlling an electronic device by gestures is achieved, and a user experience is improved.

Computer program instructions corresponding to the control method in the embodiment of the application may be stored in a storage medium, such as a compact disk, a hard disk, and a flash disk. When being read or executed by an electronic device, the computer program instructions, in a storage medium, corresponding to the control method includes:

determining a first operating area where an operator performs a gesture operation according to sensing information obtained by the at least two sensing units, where, sensing information from various spatial areas are obtained by the at least two sensing units, the first operating area includes at least one spatial area of the various spatial areas; and generating and executing a first control instruction corresponding to the first operating area based on at least a configuration relationship between an operating area and an instruction, where the first control instruction is different from a second control instruction which is generated when the operator performs a gesture operation in a second operating area.

The determining a first operating area where an operator performs a gesture operation according to sensing information obtained by the at least two sensing units includes:

determining, according to the sensing information, each sensing unit sensing the operator, and temporal information of sensing an operator by each sensing unit; and calculating information of variation of spatial areas corresponding to the first operating area where the operator passes according to the temporal information of sensing the operator by each sensing unit, where each sensing unit is distinguished by a unit identity.

In the case that the at least two sensing units include a first sensing unit and a second sensing unit, information of a first spatial area is sensed by the first sensing unit, information of a second spatial area is sensed by the second sensing unit, and information of a third spatial area is sensed by both the first sensing unit and the second sensing unit.

The generating and executing a first control instruction corresponding to the first operating area based on at least a configuration relationship between an operating area and an instruction includes:

generating and executing a first sub-control information for switching forward with a plurality of outputs if the first operating area varies at least from the first spatial area to the third spatial area;

generating and executing a second sub-control information for switching backward with a plurality of outputs if the first operating area varies at least from the second spatial area to the third spatial area;

generating and executing a third sub-control information for switching forward or backward with one output if the first operating area is inside the third spatial area.

After the sensing information is obtained by the at least two sensing units, the method further includes:

obtaining gesture information of the gesture operation from the sensing information, where the gesture information is for assisting in determining the first control instruction.

The generating and executing a first control instruction corresponding to the first operating area based on at least a configuration relationship between an operating area and an instruction includes:

generating and executing a fourth sub-control instruction if the first operating area is determined including the third spatial area, otherwise forbidding responding to the gesture operation.

The at least two sensing units include: distance sensing units, or image capture units, or light sensing units.

The application has been described with some embodiments. Once learning the basic creative concept, those skilled in the art may perform alternations and modifications on these embodiments. Therefore, the appended claims are intended to be construed as comprising the embodiments and all the alternations and modifications falling in the scope of the application.

Apparently, those skilled in the art may carry out various modifications and transformations on the application, without departing from the spirit and the scope of the application. Thus, the application is intended to comprise the modifications and transformations, if the modifications and transformations of the application are within the scope of the claims of application or equivalent technology thereof.

The invention claimed is:

1. A control method applied to an electronic device on which at least two sensing units, including a first sensing unit and a second sensing unit, are arranged, the method comprising:
   determining a first operating area where an operator performs a gesture operation according to sensing information obtained by the at least two sensing units, wherein, sensing information from various spatial areas are obtained by the at least two sensing units, the first operating area comprises at least one spatial area of the various spatial areas; and
   generating and executing a first control instruction corresponding to the first operating area based on at least a configuration relationship between an operating area and an instruction, wherein the first control instruction is different from a second control instruction which is generated when the operator performs a gesture operation in a second operating area;
   wherein information of a first spatial area is sensed by the first sensing unit, information of a second spatial area is sensed by the second sensing unit, and information of a third spatial area is sensed by both the first sensing unit and the second sensing unit, and
   wherein generating and executing a first control instruction corresponding to the first operating area based on at least a configuration relationship between an operating area and an instruction comprises:
   generating and executing first sub-control information for switching forward with a plurality of outputs of the electronic device if the first operating area varies at least from the first spatial area to the third spatial area; and
   generating and executing second sub-control information for switching backward with the plurality of outputs of the electronic device if the first operating area varies at least from the second spatial area to the third spatial area.

2. The method according to claim 1, wherein determining a first operating area where an operator performs a gesture operation according to sensing information obtained by the at least two sensing units comprises:
   determining, according to the sensing information, each sensing unit sensing the operator, and temporal information of sensing an operator by each sensing unit; and
   calculating, according to the temporal information of sensing the operator by each sensing unit, information of variation of spatial areas corresponding to the first operating area where the operator passes, wherein each sensing unit is distinguished by a unit identity.

3. The method according to claim 2, wherein generating and executing a first control instruction corresponding to the first operating area based on at least a configuration relationship between an operating area and an instruction comprises:
   generating and executing third sub-control information for switching forward or backward with one output of the electronic device if the first operating area is inside the third spatial area.

4. The method according to claim 2, after the sensing information is obtained by the at least two sensing units, further comprising:
   obtaining gesture information of the gesture operation from the sensing information, wherein the gesture information is for assisting in determining the first control instruction.

5. The method according to claim 2, wherein the at least two sensing units comprise:
   distance sensing units, image capture units, or light sensing units.

6. The method according to claim 1, after the sensing information obtained by the at least two sensing units, further comprising:
   obtaining gesture information of the gesture operation from the sensing information, wherein the gesture information is for assisting in determining the first control instruction.

7. The method according to claim 1, wherein generating and executing a first control instruction corresponding to the first operating area based on at least a configuration relationship between an operating area and an instruction comprises:
   generating and executing a fourth sub-control instruction if the first operating area is determined comprising the third spatial area, otherwise forbidding responding to the gesture operation.

8. The method according to claim 1, wherein the at least two sensing units comprise:
   distance sensing units, image capture units, or light sensing units.

9. The method according to claim 1, wherein the at least two sensing units comprise:
   distance sensing units, image capture units, or light sensing units.

10. An electronic device, on which at least two sensing units, including a first sensing unit and a second sensing unit, are arranged, comprising:
    a determination unit determining a first operating area where an operator performs a gesture operation according to sensing information obtained by the at least two sensing units, wherein, sensing information from various spatial areas are obtained by the at least two sensing units, the first operating area comprises at least one spatial area of the various spatial areas; and
    an execution unit generating and executing a first control instruction corresponding to the first operating area based on at least a configuration relationship between an operating area and an instruction, wherein the first control instruction is different from a second control instruction which is generated when the operator performs a gesture operation in a second operating area,
    wherein information of a first spatial area is sensed by the first sensing unit, information of a second spatial area is sensed by the second sensing unit, and information of a third spatial area is sensed by both the first sensing unit and the second sensing unit,
    wherein the execution unit generates and executes first sub-control information for switching forward with a plurality of outputs of the electronic device if the first operating area varies at least from the first spatial area to the third spatial area, and
    wherein the execution unit generates and executes second sub-control information for switching backward with the plurality of outputs of the electronic device if the first operating area varies at least from the second spatial area to the third spatial area.

11. The electronic device according to claim 8, wherein the determination unit:
   determines, according to the sensing information, each sensing unit sensing the operator, and temporal information of sensing an operator by each sensing unit; and
   calculates information of variation of spatial areas corresponding to the first operating area where the operator passes according to the temporal information of sensing the operator by each sensing unit, wherein each sensing unit is distinguished by a unit identity.

12. The electronic device according to claim 11, wherein the execution unit
   generates and executes third sub-control information for switching forward with one output of the electronic device if the first operating area is inside the third spatial area.

13. The electronic device according to claim 11, wherein the electronic device further:
   obtains gesture information of the gesture operation from the sensing information, wherein the gesture information is for assisting in determining the first control instruction.

14. The electronic device according to claim 11, wherein the at least two sensing units comprise:
   distance sensing units, image capture units, or light sensing units.

15. The electronic device according to claim 10, wherein the electronic device further:
   obtains gesture information of the gesture operation from the sensing information, wherein the gesture information is for assisting in determining the first control instruction.

16. The electronic device according to claim 10, wherein, the executing unit further:
   generates and executes a fourth sub-control instruction if the first operating area is determined comprising the third spatial area, otherwise forbidding responding to the gesture operation.

17. The electronic device according to claim 10, wherein the at least two sensing units comprise:
   distance sensing units, image capture units, or light sensing units.

18. The electronic device according to claim 10, wherein the at least two sensing units comprise:
   distance sensing units, image capture units, or light sensing units.

* * * * *